United States Patent
Gan et al.

(10) Patent No.: US 9,436,169 B2
(45) Date of Patent: Sep. 6, 2016

(54) SYSTEM ENERGY EFFICIENCY CONTROLLER IN SMART ENERGY NETWORK, CONTROL METHOD THEREOF, AND CONTROL METHOD FOR TERMINAL DEVICE

(75) Inventors: Zhongxue Gan, Langfang (CN); Shenglong Dong, Langfang (CN); Qizhi Cai, Langfang (CN)

(73) Assignee: ENN SCIENCE & TECHNOLOGY DEVELOPMENT CO., LTD., Langfang (CN)

( * ) Notice: Subject to any disclaimer, the term of this patent is extended or adjusted under 35 U.S.C. 154(b) by 691 days.

(21) Appl. No.: 13/884,963

(22) PCT Filed: Nov. 4, 2011

(86) PCT No.: PCT/CN2011/081783
§ 371 (c)(1),
(2), (4) Date: Aug. 12, 2013

(87) PCT Pub. No.: WO2012/062184
PCT Pub. Date: May 18, 2012

(65) Prior Publication Data
US 2014/0148964 A1 May 29, 2014

(30) Foreign Application Priority Data
Nov. 11, 2010 (CN) .......................... 2010 1 0544624

(51) Int. Cl.
G05B 15/02 (2006.01)
G06Q 50/06 (2012.01)
G06Q 10/06 (2012.01)
H02J 13/00 (2006.01)

(52) U.S. Cl.
CPC ......... *G05B 15/02* (2013.01); *G06Q 10/06313* (2013.01); *G06Q 50/06* (2013.01);
(Continued)

(58) Field of Classification Search
CPC ... G05B 19/02; G05B 15/02; H02J 13/0079; G06Q 10/06313; G06Q 50/06

USPC .......................................................... 700/297
See application file for complete search history.

(56) References Cited

U.S. PATENT DOCUMENTS

2010/0100253 A1   4/2010  Fausak et al.
2010/0299550 A1*  11/2010 Bengtson ............... F03D 7/047
                                                     713/375

(Continued)

FOREIGN PATENT DOCUMENTS

CN    2380846 Y    5/2000
CN    1945472 A    4/2007

(Continued)

OTHER PUBLICATIONS

CN Office Action dated Dec. 1, 2014 as received in Application No. 201010544624.1.

*Primary Examiner* — Robert Fennema
*Assistant Examiner* — Sivalingam Sivanesan
(74) *Attorney, Agent, or Firm* — Maschoff Brennan

(57) ABSTRACT

A system energy efficiency controller in a smart energy network, a control method thereof, and a control method for a terminal device. The system energy efficiency controller includes a control decision module, a storage module, a power clock module, an internal communication module, and an external communication module. The storage module is connected to the control decision module, and stores temporary and permanent information data in the operation process of the storage system. The power clock module provides an internal clock, achieving timing synchronization of processors on the controller. The internal communication module provides two-way communication between the system energy efficiency controller and control implementation units of multiple terminal devices. The external communication module provides two-way communication between the system energy efficiency controller and a local optimizer. The multiple terminal devices include at least one of the terminal devices for the stages of energy production, storage, application and regeneration.

11 Claims, 6 Drawing Sheets

(52) U.S. Cl.
CPC ........ *H02J13/0079* (2013.01); *Y02B 70/3216* (2013.01); *Y02E 40/76* (2013.01); *Y02E 60/74* (2013.01); *Y04S 10/30* (2013.01); *Y04S 10/545* (2013.01); *Y04S 20/221* (2013.01)

(56) References Cited

U.S. PATENT DOCUMENTS

| | | | | |
|---|---|---|---|---|
| 2011/0093127 | A1* | 4/2011 | Kaplan | G06Q 10/04 700/292 |
| 2011/0106327 | A1* | 5/2011 | Zhou | G05B 13/024 700/291 |
| 2012/0104770 | A1* | 5/2012 | Jacob | B60L 11/14 290/40 B |

FOREIGN PATENT DOCUMENTS

| | | |
|---|---|---|
| CN | 201000162 Y | 1/2008 |
| CN | 101122793 A | 2/2008 |
| CN | 101373378 A | 2/2009 |
| CN | 101414172 A | 4/2009 |
| CN | 201255834 Y | 6/2009 |
| CN | 101477367 A | 7/2009 |
| CN | 101655272 A | 2/2010 |
| CN | 201576195 U | 9/2010 |
| CN | 201611444 U | 10/2010 |
| CN | 201616021 U | 10/2010 |
| CN | 102236342 A | 11/2011 |
| CN | 102236343 A | 11/2011 |
| JP | 2001-109511 A | 4/2001 |
| JP | 2004-206216 A | 7/2004 |

* cited by examiner

Energy Flow

Matter Flow

SYSTEM ENERGY EFFICIENCY CONTROLLER IN SMART ENERGY NETWORK, CONTROL METHOD THEREOF, AND CONTROL METHOD FOR TERMINAL DEVICE

FIELD OF THE INVENTION

The present invention relates to a system energy efficiency controller and a system control method for realizing optimized utilization of energies, and in particular, to a system energy efficiency controller and a system control method used in a ubiquitous energy network for realizing optimized utilization of distributed energies.

BACKGROUND OF THE INVENTION

One of essential aspects to realize low-carbon economy lies in improving the overall utilization efficiency of energies. By combining the existing power grid with network communication technologies, the intelligentized generation, transmission and utilization of an electrical energy may be achieved. A basic characteristic of a smart power grid is technology informationization, automation and interaction. An interactive power grid proposed by a Chinese scholar named Jiandong W U implements intelligentized, informationized, and hierarchical interactive management on the overall process of the electric power industry including power generation, power transmission, power supply, power utilization, power vendition, hierarchical scheduling of power grid, integrated services, etc., by incorporating a system digital device and upgrading the power grid management system, based on an open and interconnected information mode. However, the smart power grid technology of the national power grid is an informationized technology directed to the electrical energy merely.

The schemes of Smart Planet and Cloud Calculation were proposed by IBM in 2008. The Smarter Planet scheme is also referred to as a Smarter planet scheme, in which sensors are embedded or provided in various objects such as power grids, railways, bridges, tunnels, highways, buildings, water supply systems, dams, and oil and gas pipelines, and universally connected to form the so-called Internet of Things, which may be integrated with the existing Internet to realize the integration of the human society and the physical system. The essence of the Smart Planet is the integration of the Internet of Things and the existing Internet, and the Cloud Calculation is used to provide certain data service functions on the topmost layer.

Although the connections of objects are realized by the Smart Planet scheme of IBM, the Smart Planet scheme lacks overall optimization and coordinated control on energy systems, thus the economic and social benefits as desired by users cannot be fully realized. Furthermore, the Smart Planet scheme entirely depends on the coverage rate of the Internet of Things and the existing Internet, and has a flat, large and complicated network structure, as a result, it is impossible to change the system scale according to user requirements and achieve flexible and robust networking optimization.

Therefore, a ubiquitous energy network solution was proposed by the applicant in Chinese Patent Applications No. 201010173519.1 and No. 201010173433.9, which are incorporated herein by reference in their entirety, to realize the intelligentization and informatization of various energies and matters, and the coupled utilization, management and transaction services of multiple energies (e.g. various types of energies and/or energies from different geographic positions).

With the ubiquitous energy network based on system energy efficiency technologies, a real-time cooperation of energy input and output across time domain and territories is implemented by the coupling of energies with information in four stages of generation, storage, utilization and regeneration of energy, to realize the optimization of whole system life cycle and the improved energy efficiency. An energy efficiency control system is used for matching of energy supplies with energy demands, stepped utilization and space-time optimization of various energy flows, to achieve the maximized system energy efficiency, and eventually output a self-organized, highly-ordered and efficient intelligent energy.

However, it is still necessary to provide a system energy efficiency controller and a system control method where the functional definition and the cooperation mode of each network node has been defined, so that a stable and flexible network architecture can be easily realized.

SUMMARY OF THE INVENTION

Therefore, it is an object of the present invention to provide a system energy efficiency controller and a system control method used in a ubiquitous energy network for realizing distributed energy optimization and utilization.

According to one aspect of the invention, there provides a system energy efficiency controller for a ubiquitous energy network, which comprises: a control decision module; a storage module, which is connected with the control decision module, and adapted for storing temporary and permanent data information generated during a system operation process; a power clock module, which is connected with the control decision module, and adapted for providing an internal clock and realizing the timing synchronization of a plurality of processors on the controller; an internal communication module, adapted for providing bidirectional communication between the system energy efficiency controller and control implementing units of a plurality of terminal devices; and an external communication module, adapted for providing bidirectional communication between the system energy efficiency controller and an upper-layer local-area optimizer; wherein, the plurality of terminal devices include terminal devices in the four stages of energy generation, energy storage, energy utilization and energy regeneration.

According to another aspect of the invention, there provides a control method performed by a system energy efficiency controller, which comprises steps of:

a) establishing/updating a four-stage model according to a preset time/event driving principle;

b) reading decision information of a wide-area control layer and a local-area optimization layer from an upper-layer local-area optimizer via an external communication channel;

c) collecting sensor information of the terminal devices in the four stages of energy generation, energy storage, energy utilization and energy regeneration inside a controlled area via an internal communication channel;

d) performing system optimization according to the four-stage model and the received decision information and sensor information;

e) performing energy efficiency gaining according to the four-stage model and the received decision information and sensor information;

f) distributing control information to the terminal devices in the four stages of energy generation, energy storage, energy utilization and energy regeneration via the internal communication channel;

g) determining whether a suitable opportunity for reporting operating information has arrived;

h) reporting the operating information to the local-area optimizer via the external communication channel at the ubiquitous energy control layer if it is determined that the suitable opportunity for reporting operating information has arrived;

i) determining whether a suitable opportunity for updating the system model has arrived;

j) repeating steps a)-i) if it is determined that a suitable opportunity for updating the system model has arrived; and k) repeating steps b)-j) if it is determined that a suitable opportunity for updating the system model has not arrived.

According to a further aspect of the invention, there provides a control method performed by terminal devices in four stages of energy generation, energy storage, energy utilization and energy regeneration, which comprises steps of:

a) reading control information of a corresponding terminal device from a system energy efficiency controller via an internal communication channel at a ubiquitous energy control layer;

b) collecting local sensed information and operating information of the corresponding terminal device, and temporally storing the collected information in a local storage;

c) controlling operating parameters of the corresponding terminal device according to the control information that is read;

d) determining whether a suitable opportunity for reporting the operating information has arrived;

e) reporting the system operating information to the system energy efficiency controller via the internal communication channel at a ubiquitous energy control layer, if it is determined that the suitable opportunity for reporting operating information has arrived; and f) repeating steps a)-e).

By realizing distributed bottom-layer control by way of hierarchical information interaction, on one hand, the system energy efficiency controller may track the upper-layer optimization information and adjust the control strategy in time; and on the other hand, it may ensure the accuracy of the control object by continuously updating the models. Moreover, the distributed bottom-layer control solution is beneficial for the speediness, clearness and veraciousness of a control action and less demanding for the communication bandwidth; and the in-time report of the operating information is helpful for an upper-layer network to learn about the operation status of a subsystem in time, for the purpose of further optimization.

With the system energy efficiency controller and the system control method of the invention, a wide-area ubiquitous energy network with a hierarchical architecture may be constructed based on the existing technologies. In such a wide-area ubiquitous energy network with a hierarchical architecture, network nodes works cooperatively and realize the control, optimization and coordination of the four stages of energy generation, energy storage, energy utilization and energy regeneration in their respective areas, so that optimal system energy efficiency can be obtained.

A compact local-area ubiquitous energy network may also be constructed easily and conveniently, and the space-domain and time-domain integrated optimization of each stage of energy generation, energy storage, energy utilization and energy regeneration may be realized in a certain range, thus the energy utilization efficiency may be increased, the cost and consumption may be reduced, so that a maximum system energy efficiency may be obtained.

DETAILED DESCRIPTION OF THE EMBODIMENTS

Figure 1:
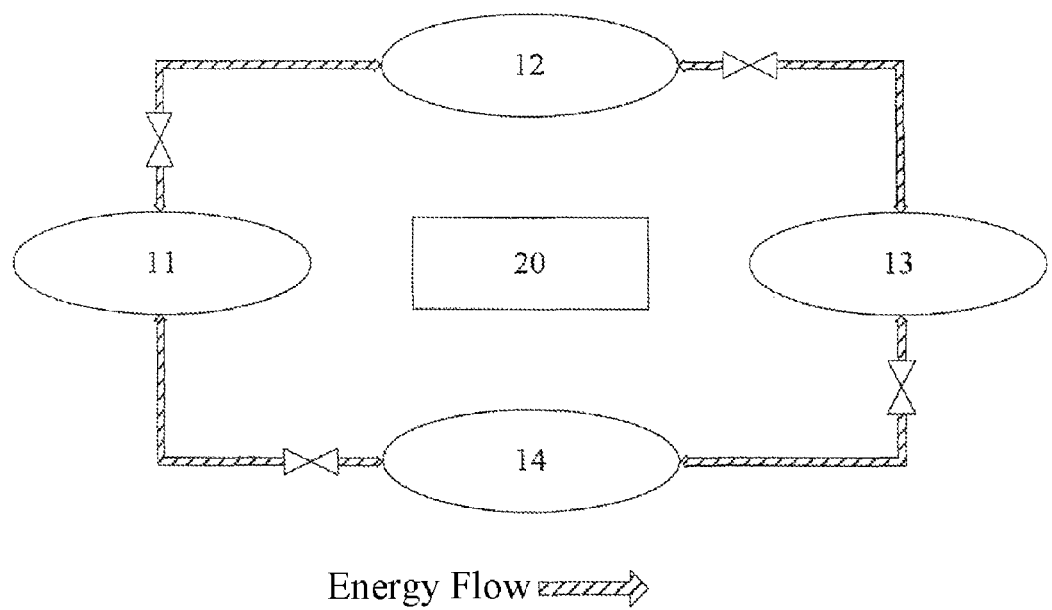
FIG. 1 schematically shows an energy subnetwork of a ubiquitous energy network.

First of all, the terms used in this application will be illustrated as follows:

A system energy efficiency refers to the energy utilization efficiency or effect in a system, which includes a group of parameters for evaluating the utilization effect of the system on the grade and quantity of energies, for example, a thermal efficiency, an electrical efficiency, an exergy efficiency, etc. An important improvement of the system energy efficiency is the matching of the grade and quantity of energy supply with demands, which improves people's energy generation mode and energy utilization mode.

A ubiquitous energy network is formed by nodes that are connected together via a virtual pipeline interconnected network architecture for transmitting a ubiquitous energy flow, with ubiquitous energy flows being bidirectionally transmitted between the nodes. The nodes include a system energy efficiency controller, and at least one from a group consisted of other nodes connected to the system energy efficiency controller, an energy generation device, an energy storage device, an energy utilization device and an energy regeneration device. The system energy efficiency controller controls the input and output of ubiquitous energy flow of at least one of: the other nodes, the energy generation device, the energy storage device, the energy utilization device and the energy regeneration device; and the ubiquitous energy flow includes a logic smart flow formed by coupling and cooperating an energy flow, a material flow and an information flow.

A ubiquitous energy control layer is the bottommost layer of the ubiquitous energy network and takes the basic four stages of energy generation, storage, utilization and regeneration as a control object. The control layer receives an optimization instruction from an upper layer, controls various energy devices based on the integrated local real-time information to achieve the optimal energy efficiency of a subsystem consisting of the four stages of energy generation, storage, utilization and regeneration within a control range, and feeds back operating information of the subsystem to the upper layer.

A local-area optimization layer is an intermediate layer of the ubiquitous energy network above the ubiquitous energy control layer, and is used for integrated optimization on a plurality of subsystems each consisting of the four stages of energy generation, storage, utilization and regeneration in an area. The local-area optimization layer receives messages from two directions, i.e. operating information of each subsystem consisting of the four stages of energy generation, storage, utilization and regeneration in the controlled area from the internal, and upper-layer coordinating and planning information from the external. The local-area optimization layer integrates such information, generates optimization information based on a certain optimization strategy and sends the optimization information to each subsystem consisting of the four stages of energy generation, storage, utilization and regeneration, and further sends the local operating information to an upper layer.

A wide-area coordination layer, which is the upmost layer of the ubiquitous energy network, receives the information from the local-area optimization layer, carries out uniform coordinating and planning on the energy operation situations in the whole area by means of cloud calculation, cloud optimization, etc., and distributes the coordination information to each node in the next network.

Terminal devices refer to various devices and machines in the four stages of energy generation, storage, utilization and regeneration, including an integrated photovoltaic board, a vacuum heat collector, a gas electric generator, a heat pump, a cold storage tank, a storage battery, various household appliances, microalgae pools, etc. Each of the devices has an automatic control function, is capable of collecting local physical information, and may accept an external control command.

A system energy efficiency controller, which is a master control device at the ubiquitous energy control layer and performs the functions of the ubiquitous energy control layer, performs integrated control according to the operating information of each of the terminal devices in the four stages of energy generation, storage, utilization and regeneration in the controlled range of the system energy efficiency controller, and carries out bidirectional ubiquitous energy flow interaction with a node of the upper-layer network.

A local-area optimizer, which is a network node at the local-area optimization layer and performs an area optimization function, performs integrated optimization according to the operating information uploaded by each controller inside an area and the upper-layer planning information, and sends the operating information of the area to a node of the upper-layer network.

A wide-area coordinator, which is a network node at the wide-area coordination layer and performs a function of wide-area coordinating and planning, generally has functions of cloud optimization and cloud service, carries out uniform coordination according to energy operation status of the whole area and generates the planning information required by the local-area optimization layer on one hand, and backs up the important operating parameters of the whole system as a reference for energy service and policy planning in an area.

Referring to FIG. 1, the energy subnetwork of a ubiquitous energy network functions as an energy part in the network structure of the ubiquitous energy network, and includes energy transmission pipelines and connection devices between terminal devices in the four stages of energy generation 11, energy storage 12, energy utilization 13 and energy regeneration 14. According to the invention, the energy subnetwork lies on the periphery of the network structure of the ubiquitous energy network, to implement connections according to technological requirements between the energy devices.

An energy flow, as a part of the ubiquitous energy flow, flows between the terminal devices in the four stages of energy generation 11, energy storage 12, energy utilization 13 and energy regeneration 14, and an energy output end of each of the terminal devices is equipped with a control valve for controlling the flow rate, quality, switching time and so on of the output energy. The system energy efficiency controller 20 does not directly control these valves. The energy flow direction shown here constitutes a logic schematic diagram, and may be adapted according to specific processes in practical engineering.

Figure 2:
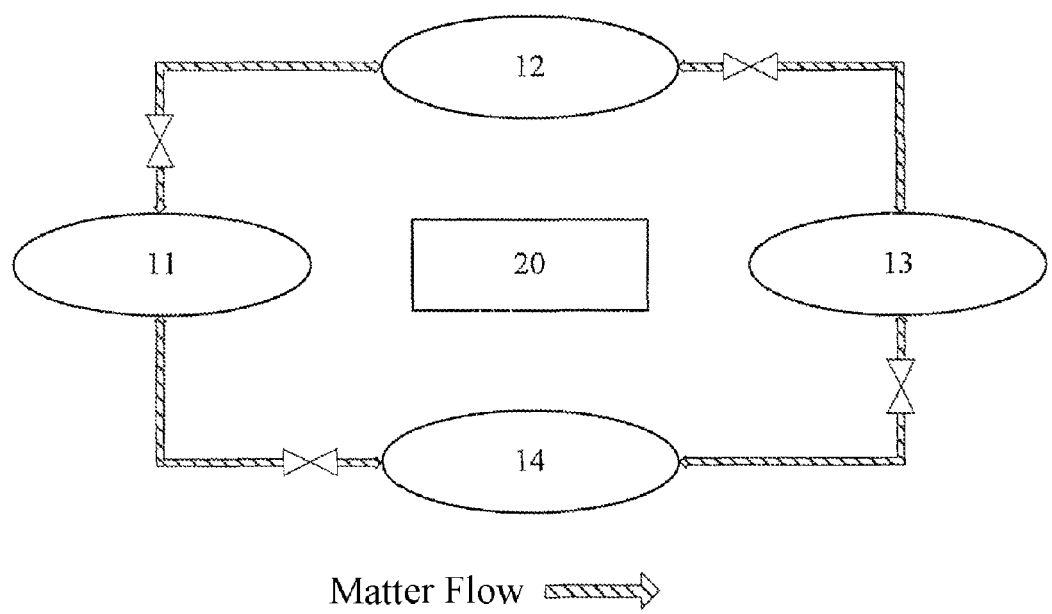
FIG. 2 schematically shows a material subnetwork of the ubiquitous energy network.

Referring to FIG. 2, the material subnetwork of a ubiquitous energy network functions as a matter part in the network structure of the ubiquitous energy network, and includes matter transmission pipelines and connection devices between the terminal devices in the four stages of energy generation 11, energy storage 12, energy utilization 13 and energy regeneration 14. According to the invention, the material subnetwork lies on the periphery of the network structure of the ubiquitous energy network, to implement connections according to technological requirements between the energy devices.

A matter flow, as a part of the ubiquitous energy flow, flows between the terminal devices in the four stages of energy generation 11, energy storage 12, energy utilization 13 and energy regeneration 14, and a matter output end of each of the devices is equipped with a control valve for controlling a flow rate, quality, switching time and so on of the output matter. The system energy efficiency controller 20 does not directly control these valves. The matter flow direction shown here constitutes a logic schematic diagram, and may be adapted according to the specific processes in practical engineering.

Figure 3:
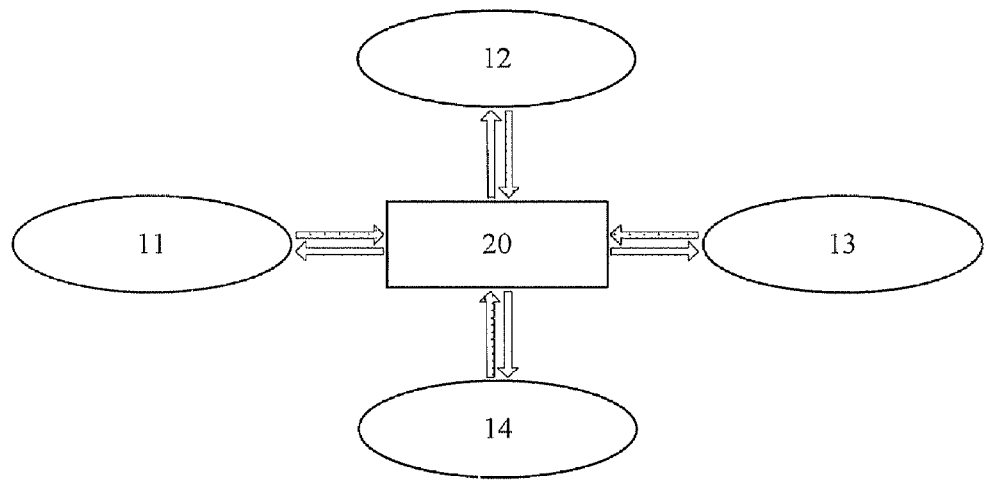
FIG. 3 schematically shows an information subnetwork of the ubiquitous energy network.

Referring to FIG. 3, the information subnetwork of a ubiquitous energy network functions as an information communication part in the network structure of the ubiquitous energy network. According to the invention, no direct information communication channel exists between the terminal devices in the four stages of energy generation 11, energy storage 12, energy utilization 13 and energy regeneration 14; instead, the information interconnection is implemented via network nodes. The information subnetwork lies at the center of the network structure of the ubiquitous energy network, and a bidirectional information channel exists between each terminal device and the system energy efficiency controller 20, for transmitting the sensed information and control information.

It should be noted that, the control information sent by the system energy efficiency controller 20 to the terminal device is an instruction at the subsystem behavior level, and each terminal device has an autonomous control implementing unit, which transforms, according to its own device model, an instruction from the system energy efficiency controller into a control interrupt, a control voltage, a current, a stepper motor drive signal and so on that are required for controlling.

Furthermore, the communication mode between the system energy efficiency controller 20 and each terminal device may depends on the operating environment of the device, to meet operating conditions required by the subsystem, for example, a temperature range, a pressure change, a power consumption/cost requirement and engineering convenience. An example of the communication solution will be given below.

Figure 4:
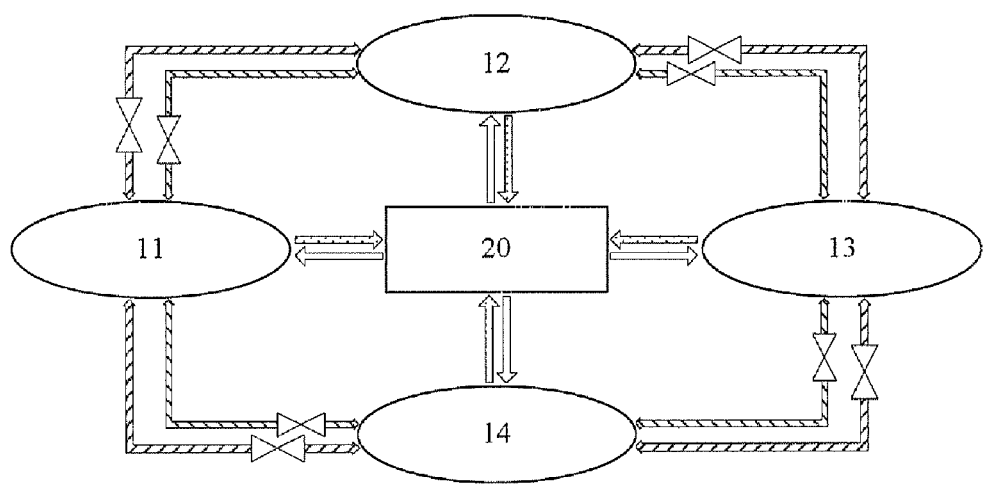
FIG. 4 schematically shows the logical structure of the whole ubiquitous energy network.

FIG. 4 schematically shows the logical structure of the whole ubiquitous energy network. The energy subnetwork and the material subnetwork construct the periphery of the ubiquitous energy network structure, while the information subnetwork lies at the center of the ubiquitous energy network structure.

Energy channels and matter channels are arranged between the terminal devices in the four stages of energy generation 11, energy storage 12, energy utilization 13 and energy regeneration 14.

The system energy efficiency controller 20 is connected with each of the terminal devices in the four stages of energy generation 11, energy storage 12, energy utilization 13 and energy regeneration 14 via an information channel, thus bidirectional information communication is realized, so that interconnection of the whole network structure is accomplished.

During operating, each terminal device sends its local sensed information to the system energy efficiency controller 20, which in turn integrates the operation status of all terminal devices, generates control information for each terminal device based on the system energy utilization efficiency optimization and gain algorithm and sends the control information to the terminal device, so that the control information is transformed into a drive signal needed for controlling via an internal model of each terminal device.

The terminal devices in the four stages of energy generation 11, energy storage 12, energy utilization 13 and energy regeneration 14, the system energy efficiency controller 20, the energy channel, the matter channel, the information channel, the control valve and so on work cooperatively to realize the energy efficiency optimization in the four stages of energy generation 11, energy storage 12, energy utilization 13 and energy regeneration 14. The system energy efficiency controller constructs positive feedback loops between the various terminal devices, so that the terminal devices are excited mutually by their outputs, thereby realizing the optimization of system energy utilization efficiency.

Moreover, by introducing an environment potential energy, the system energy efficiency controller makes the overall efficiency output larger than the sum of the operation efficiencies of the respective devices, thereby realizing a gain of system energy utilization efficiency.

Figure 5:
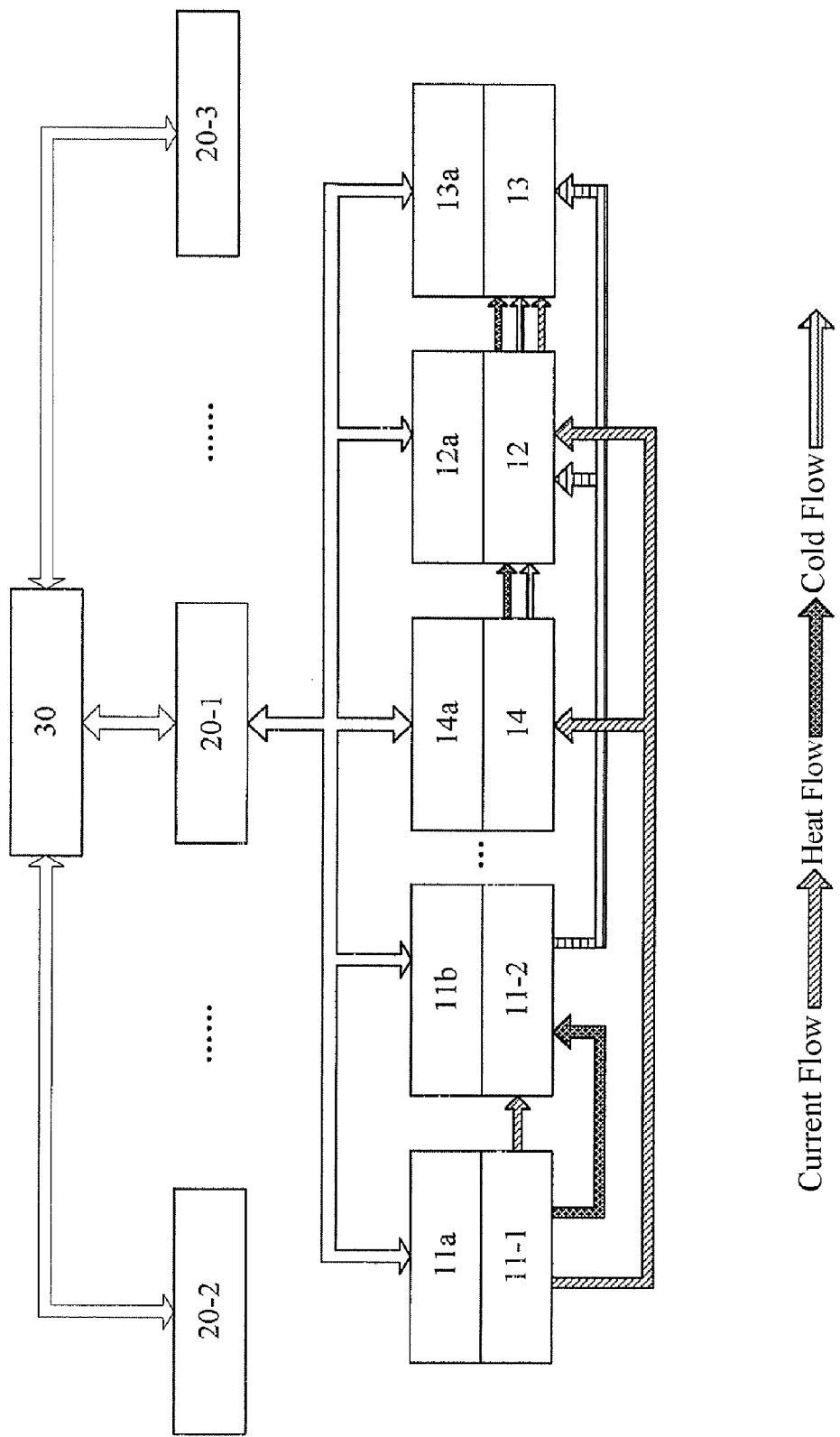
FIG. 5 schematically shows an example of the hierarchical architecture of the ubiquitous energy network, where a system energy efficiency controller is in communication with a terminal device and an upper-layer local-area optimizer.

FIG. 5 schematically shows an example of the hierarchical architecture of a ubiquitous energy network, where, the system energy efficiency controllers 20-1 to 20-3 are in communication with the terminal devices 11-1, 11-2, 12, 13, 14 and the upper-layer local-area optimizer 30.

As shown, the ubiquitous energy network includes three layers from bottom to top, i.e. the ubiquitous energy control layer, the local-area optimization layer and the wide-area coordination layer (not shown). The network nodes of these layers are respectively system energy efficiency controllers 20-1 to 20-3, a local-area optimizer 30 and a wide-area coordinator (not shown).

The ubiquitous energy control layer controls the terminal devices in the four stages of energy generation, energy storage, energy utilization and energy regeneration in real time. Based on the system energy efficiency controllers 20-1 to 20-3, the ubiquitous energy control layer integrates the subsystem operating information and the optimization information from upper-layer network nodes, and controls each terminal device based on the strategy of local energy efficiency optimization control.

The local-area optimization layer lies at the middle of the ubiquitous energy network and above the control layer, and performs integrated optimization on a plurality of energies in the subsystem consisting of the four stages of energy generation, energy storage, energy utilization and energy regeneration in an area.

The wide-area coordination layer is the upmost layer of the ubiquitous energy network, receives the information from the local-area optimization layer, carries out a uniform coordinated planning on the energy operation situation in the whole area by means of cloud calculation, cloud optimization and so on, and distributes the coordination information to each node in the next network.

In this example of the hierarchical architecture, the system energy efficiency controller 20-1 is in bidirectional communication with terminal devices in the energy generation stages 11-1 and 11-2, a terminal device in the energy regeneration stage 14, a terminal device in the energy storage stage 12 and a terminal device in the energy utilization stage 13 inside the controlled area via internal communication channels at the ubiquitous energy control layer, where the system energy efficiency controller receives the sensed information of each terminal device and sends out the control information.

The terminal device in the energy generation stage 11-1 may be a power generating device for example, for generating an electric current flow and a heat flow; the terminal device in the energy generation stage 11-2 may be a cooling device for example, for generating a cold flow; the regeneration device in the energy regeneration stage 14 may regenerate a heat flow and a cold flow. The current flow and the heat flow generated by the power generating device, the cold flow generated by the cooling device, and the heat flow and cold flow regenerated by the regeneration device may be provided to and used by the terminal devices in the energy storage stage 12 and the energy utilization stage 13.

Furthermore, the terminal device in each stage further includes autonomous control implementing units 11a, 11b, 14a, 12a and 13a, which transforms the control information from the system energy efficiency controller 20-1 into a control instruction according to its own device model.

The internal communication channel may be selected based on the function and the operating environment of the terminals, considering integratedly aspects such as power consumption, real-time capability, networking mode, engineering convenience, communication distance and compatibility. The available communication modes include:

M-Bus, which is a wired connection in a bus mode, supports system dynamic update, and has a short communication distance;

Serial-port communication, for example, RS-485, which is a common serial-port point-to-point communication mode and supports both wired and wireless connections, but needs to be reset upon a system change, with small power consumption and a practical applicable transmission distance no larger than 30 m;

ZigBee, which is a wireless local area network and is a mature regional networking mode, and supports network reconstruction, with small power consumption and a maximum transmission distance of 100 m, and is applicable for home/small workshop;

433 MHz, which is a communication frequency range opened by the International Telecommunications Union-Radio (ITU-R) recently, with a basically mature module technology, a power consumption less than Zigbee, and a transmission distance similar to that of ZigBee; and FTTX+EPON, where Fiber-To-The-X (FTTX) involves a novel power transmission line based on cables containing optical fibers, and Ethernet Passive Optical Network (EPON) is physically carried on the optical fibers; FTTX+EPON is compatible with the existing Ethernet, easy for management, and is a mature technology, but the transmission lines need to be updated and information transceivers such as optical transmitters and receivers shall be introduced.

A plurality of system energy efficiency controllers 20-1, 20-2 and 20-3 may be in bidirectional communication with the upper-layer local-area optimizer 30 via the external communication channels between the ubiquitous energy control layer and the local-area optimization layer. No direct information channel exists between the ubiquitous energy control layer and the wide-area coordination layer; instead, information is translated and forwarded by the local-area optimizer 30 at the local-area optimization layer, and operating and planning interactions exist between the local-area optimizer 30 and the wide-area coordinator.

In comparison with the internal communication channel, the external communication channel between the system energy efficiency controller 20 and the upper-layer local-area controller 30 has a longer transmission distance and a larger data throughput, but with less power consumption and frequency demands. The solutions available for the external communication channel include:

Ethernet interface, i.e. a network card interface, which is in either a wireless mode or a wired mode, and the communication distance and the networking scale are limited by the maturity of the Internet;

GPRS/3G, which is wireless communication based on Public Land Mobile Network (PLMN), and is applicable to an area with a good wireless communication network but immature Internet;

USB, which is a common high-speed serial interface and is directly connected with an upper level machine for realizing high-speed data interaction; or, connections of other modes may be realized via some conversion interfaces, for example, a network cable/USB interface board or a PCI/USB interface board;

EPON, which is a high-speed optical fiber interface protocol; and

PLC, which is an information interaction mode of the smart power grid, a high-frequency communication carrier is carried over the power transmission line in the existing power grid, i.e., so-called Power Line Carrier (PLC) for information interaction; the communication rate and the networking mode are flexible, given that it falls into the coverage of the smart power grid.

Figure 6:
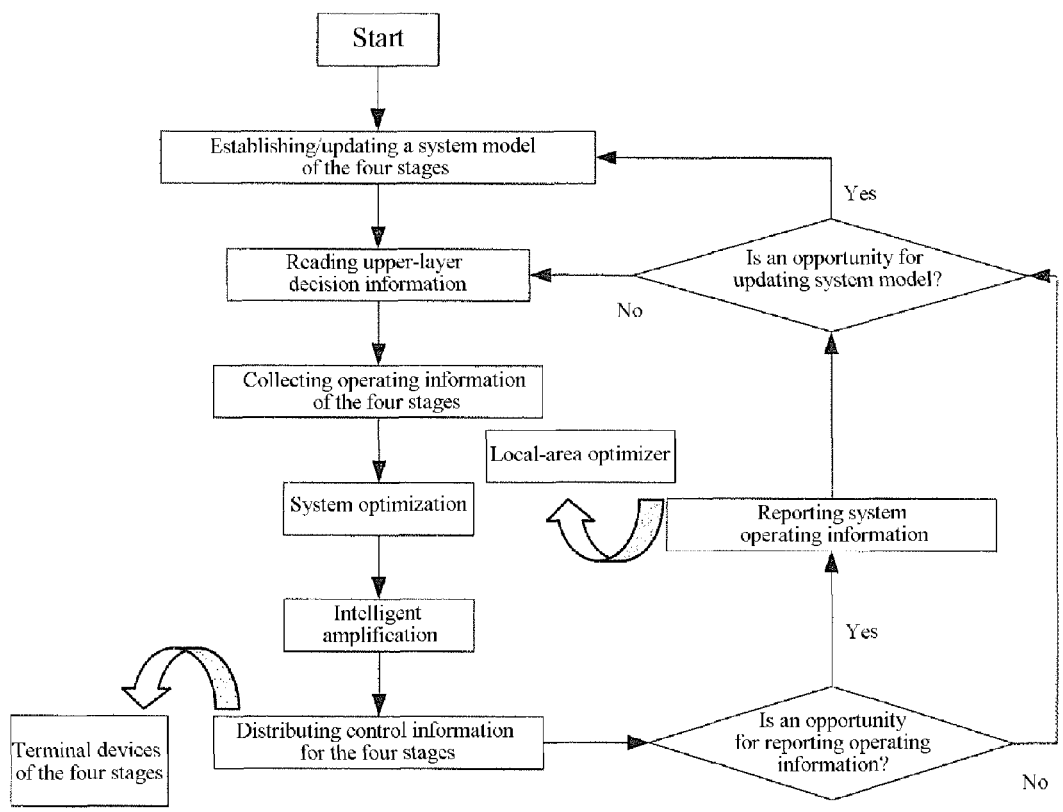
FIG. 6 schematically shows a flow chart of a control method of the system energy efficiency controller.

FIG. 6 schematically shows a flow chart of a control method of the system energy efficiency controller.

The system energy efficiency controller 20 is an essential network node of the ubiquitous energy control layer, connected with the terminal devices in the four stages of energy generation 11, energy storage 12, energy utilization 13 and energy regeneration 14 inside a controlled area to construct together a ubiquitous energy control layer on one hand, and connected with an upper-layer local-area optimizer 30 to realize the interconnection between the control layer and the local-area optimization layer of the ubiquitous energy network on the other hand.

The control method of the system energy efficiency controller 20 is used to realize the control strategy of the ubiquitous energy control layer based on the model of the four stages of energy generation, storage, utilization and regeneration.

The control method is performed according to the following steps:

Initially, a system energy efficiency controller 20 establishes/updates the four-stage model according to a preset time/event driving principle.

Further, the system energy efficiency controller 20 reads the decision information of a wide-area control layer and a local-area optimization layer from an upper-layer local-area optimizer 30 via an external communication channel. For example, the decision information read from the upper-layer local-area optimizer 30 includes: the current statistics and predicted information of wide-area energy utilization, price trend and policy tendency of energy supply, local-area energy supply and demand distribution information, and operation guide information of the terminal devices in the four stages inside the area controlled by the current system energy efficiency controller 20.

Further, the system energy efficiency controller 20 collects, via an internal communication channel, the sensor information of the terminal devices operating in the four stages of energy generation 11, energy storage 12, energy utilization 13 and energy regeneration 14 inside the controlled area.

Further, the system energy efficiency controller 20 performs system optimization and energy efficiency gaining according to the four-stage model and the received decision information and sensor information, and generates the control information for the terminal devices in the four stages of energy generation 11, energy storage 12, energy utilization 13 and energy regeneration 14.

Further, the system energy efficiency controller 20 distributes the control information to the terminal devices in the four stages of energy generation 11, energy storage 12, energy utilization 13 and energy regeneration 14 via the internal communication channel.

Further, the system energy efficiency controller 20 determines whether a suitable opportunity for reporting the operating information has arrived.

A mixed drive mode based on both time driving and event driving may be employed to determine whether a suitable opportunity for reporting the operating information has arrived, and includes the following steps of:

defining an operating information reporting timer T0 according to the minimum time granularity of the operating of the terminal device at the ubiquitous energy control layer;

triggering an interrupt signal E0 and resetting the timer T0 after the timer T0 expires since the system starts operating;

defining a report triggering condition Ci for the output of any terminal device Di, that is, if the operation status of the terminal device Di meets the condition Ci, an interrupt signal Ei is triggered, and interrupt information is recorded as Ci=1; and triggering, by the report determination function which is in an idle state at ordinary times, information reporting after obtaining the interrupt signal, and recording a type of the interrupt.

When not triggered, the system energy efficiency controller 20, the local-area optimizer 30, and the wide-area coordinator are all in an idle state. When the triggering of a timing interrupt or task interrupt signal is awaken, the system energy efficiency controller 20, the local-area optimizer 30 and the wide-area coordinator performs information reporting, thereby implementing the shifting up of states.

The task interrupt may be consisted of a plurality of sub-interrupts with different priorities; the execution process of a task with a lower priority may be interrupted by a task with a higher priority, and at the same time, the interrupt context is recorded, and then the task with the lower priority is automatically returned to the interrupt context after the task with the higher priority is completed; the idle state is at the lowest priority, and may be interrupted by interrupts with various priorities. It should be noted that, the wake-up timer and the task interrupt of the system energy efficiency controller 20, the local-area optimizer 30 and the wide-area coordinator are defined respectively according to their respective operating parameters, and construct their respective independent mixed-drive Finite State Machines (FSMs).

If a suitable opportunity for reporting operating information has arrived, the system energy efficiency controller 20 reports the operating information to the local-area optimizer 30 via the external communication channel at the ubiquitous energy control layer, and the system energy efficiency controller 20 further determines whether a suitable opportunity for updating the system model has arrived. If the suitable opportunity for reporting operating information has not arrived, it is further determined whether a suitable opportunity for updating the system model has arrived.

The system operating information reported by the system energy efficiency controller 20 includes: the remaining production capacity, raw material demands and energy generation states (e.g. a saturated state, an idle state and an overloaded state) of the production device; the smoothness, the present status and space of the energy storage of circulating equipments; the energy consumption amount and energy quality demands, the demand satisfaction situation of the energy consuming device; and the operation situation (e.g. good, idle, overload alarm, etc.) of the afterheat regeneration device, the wastewater regeneration device and the contaminated smoke regeneration device.

Further, if a suitable opportunity for updating the system model has arrived, the system energy efficiency controller 20 reestablishes/updates the four-stage model, and then the above subsequent steps are repeated. If a suitable opportunity for updating the system model has not arrived, the system energy efficiency controller 20 reads the upper-layer decision information, and then the above subsequent steps are repeated.

Figure 7:
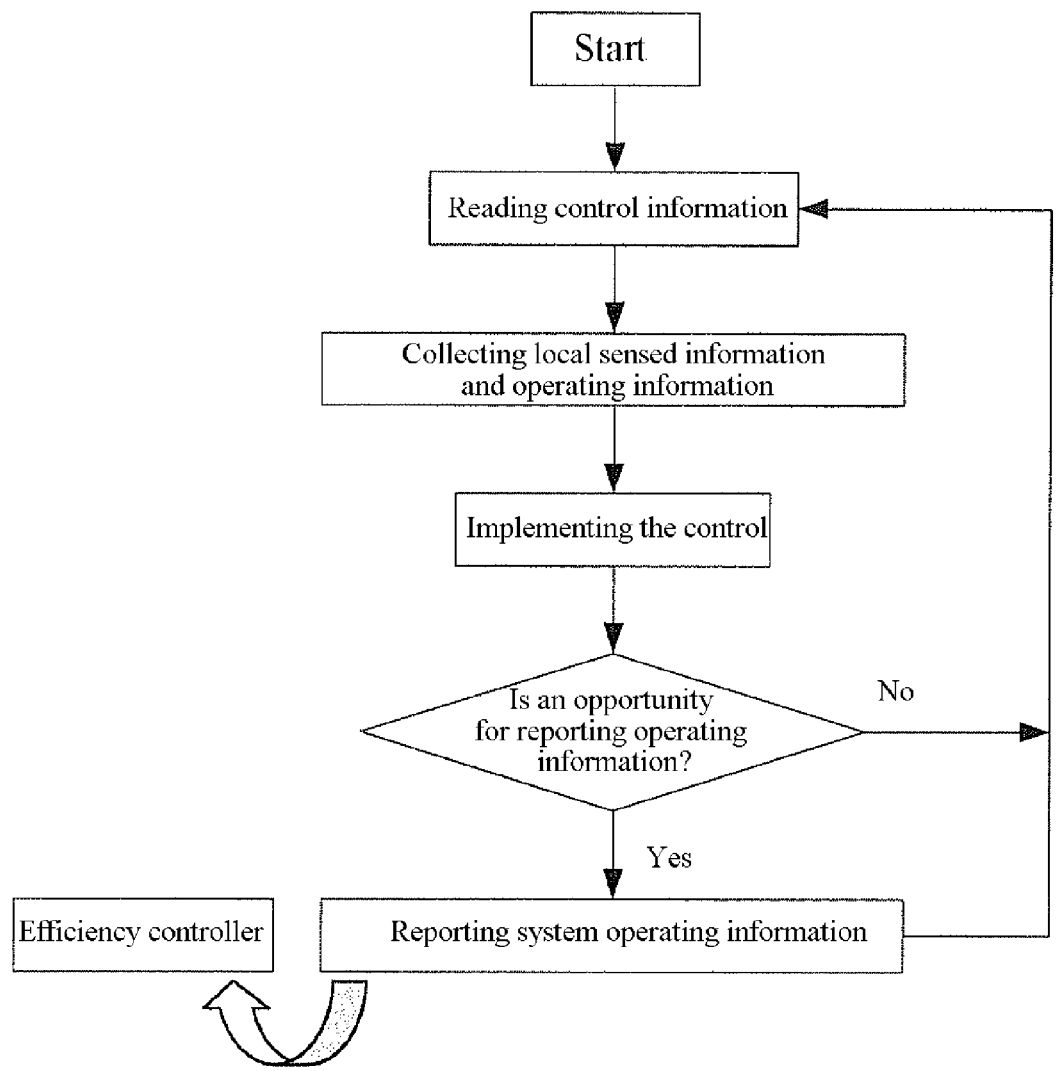
FIG. 7 schematically shows a flow chart of a control method of the terminal device.

FIG. 7 schematically shows a flow chart of the control method for terminal devices in the four stages of energy generation 11, energy storage 12, energy utilization 13 and energy regeneration 14, which is performed by, for example, the control implementing units 11a, 11b, 14a, 12a and 13a of each terminal device as shown in FIG. 5.

After the method starts, the control implementing units 11a, 11b, 14a, 12a and 13a read the control information of a corresponding terminal device from the system energy efficiency controller 20 via the internal communication channel at the ubiquitous energy control layer.

Further, the control implementing units 11a, 11b, 14a, 12a and 13a collect the local sensed information and operating information of the corresponding terminal device, and temporally store the collected information in a local register.

Further, the control implementing units 11a, 11b, 14a, 12a and 13a control the operating parameters of the corresponding terminal device according to the control information that is read.

Further, the control implementing units 11a, 11b, 14a, 12a and 13a determine whether a suitable opportunity for reporting the operating information has arrived. This step is similar to the step of determining whether a suitable opportunity for reporting the operating information has arrived that is performed by the system energy efficiency controller 20, thus will not be described again in detail hereinafter.

If it is determined that a suitable opportunity for reporting operating information has arrived, the control implementing units 11a, 11b, 14a, 12a and 13a report the system operating information to the system energy efficiency controller 20 via the internal communication channel at the ubiquitous energy control layer, and further read new control information from the system energy efficiency controller 20 via the internal communication channel at the ubiquitous energy control layer, and then the above subsequent steps are repeated. If it is determined that a suitable opportunity for reporting operating information has not arrived, the control implementing units 11a, 11b, 14a, 12a and 13a directly read new control information from the system energy efficiency controller 20 via the internal communication channel at the ubiquitous energy control layer, and then the above subsequent steps are repeated.

Different terminal devices may report different operating information. For example, the operating information to be reported by a terminal device in the energy generation stage includes: output power, output efficiency, energy quality, raw material consumption, the remaining production capacity, device operation status and alarm information. For example, the operating information to be reported by a terminal device in the energy storage stage includes: circulation efficiency (i.e. the time and cost required for transporting a unit of energy), idling situation of material circulation vehicles, remaining storage space, device alarm information, etc. For example, the operating information to be reported by a terminal device in the energy utilization stage includes: demands on cold, heat and electricity, and environment alarm information. For example, the operating information to be reported by a terminal device in the energy regeneration stage includes: afterheat recovery, wastewater treatment load, $CO_2$ recovery, device operation and alarm information.

Figure 8:
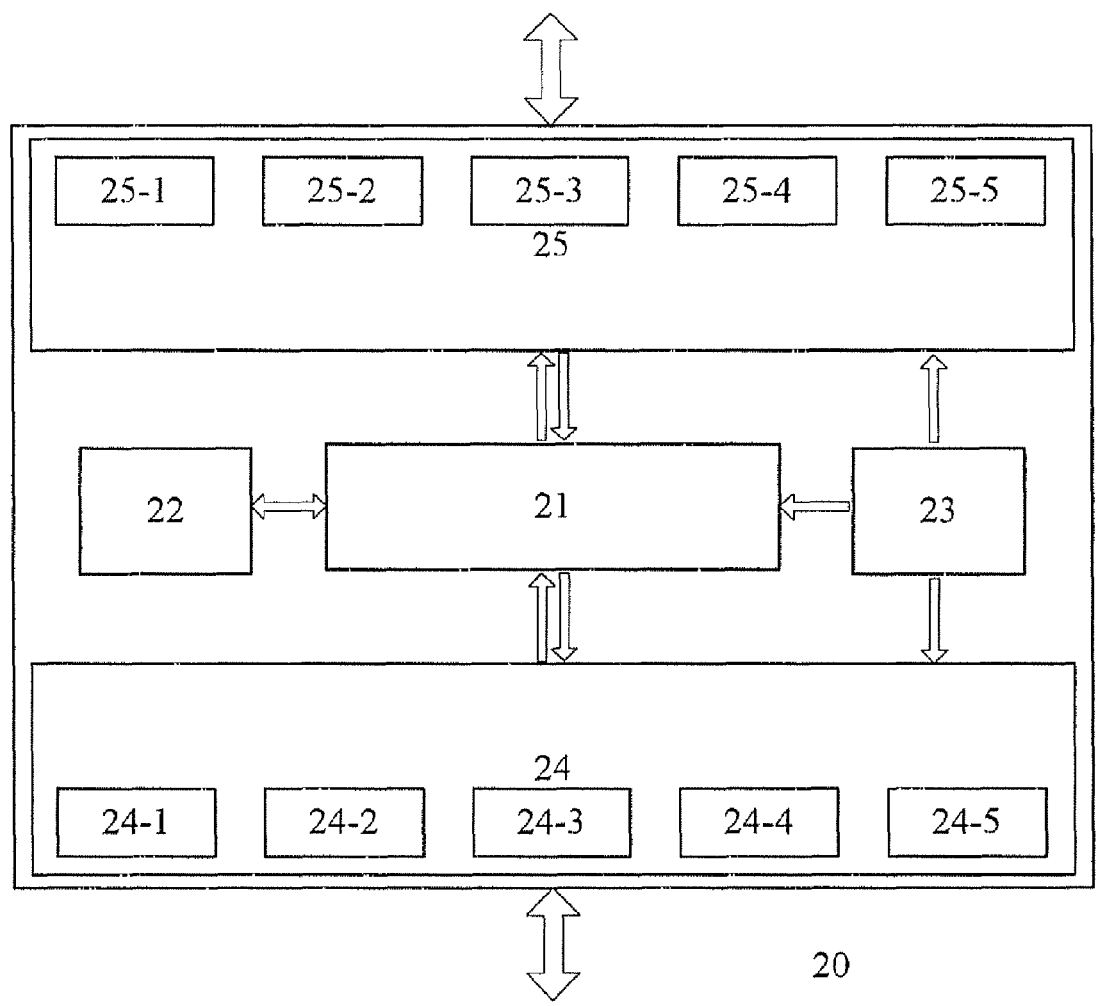
FIG. 8 is a block diagram schematically showing a hardware structure of the system energy efficiency controller.

FIG. 8 schematically shows a hardware structure block diagram of the system energy efficiency controller 20, which is used for performing the control method shown in FIG. 6. The system energy efficiency controller 20 includes: a control decision module 21, for example an ARM; a storage module 22 connected with the control decision module 21, for example a DDRAM, for storing temporary and permanent data information produced during the operation process of the system; a power clock module 23, which is connected with the control decision module 21, for providing an internal clock and realizing the timing synchronization of a plurality of processors on the controller; an internal communication module 24, for realizing bidirectional communication between the system energy efficiency controller 20 and the control implementing units 11a, 11b, 14a, 12a and 13a of terminal devices (i.e., internal communication at the ubiquitous energy control layer); and an external communication module 25, for realizing bidirectional communication between the system energy efficiency controller 20 and an upper-layer local-area optimizer 30 (i.e., external communication at the ubiquitous energy control layer).

For example, the control decision module 21 is consisted of a processor such as an ARM, used for realizing a system optimization model, and is provided with a real-time operating system, for example, Linux and ThreadX. The control decision module 21 processes the system operating information at the minimum clock cycle, and updates a control message when driven by timing/event according to the system model, and distributes the control message to each controlled device inside the controlled area.

The internal communication module 24 may include ports for various communication solutions, for example, an M-BUS port 24-1, an RS 485 port 24-2, a ZigBee port 24-3, a 433 MHz port 24-4 and an EPON port 24-5, for realizing the internal communication channel at the ubiquitous energy control layer, and the internal communication module 24 may collect the operating information of the control implementing units 11a, 11b, 14a, 12a and 13a of the various terminal devices and distribute the control information to the control implementing units 11a, 11b, 14a, 12a and 13a via the internal communication channel.

The external communication module 25 may include ports for various communication solutions, for example, an Ethernet port 25-1, a USB port 25-2, a GPRS/3G port 25-3, a PLC port 25-4 and an EPON port 25-5, for realizing the external communication channel at the ubiquitous energy control layer, and the external communication module 25 may report the subsystem operating information to the local-area controller 30 and obtain the optimization information directed to the corresponding ubiquitous energy control layer from the local-area controller 30 via the external communication channel.

The system energy efficiency controller 20 optimizes strategies and generates a control command via the firmware inside the processor; when the optimization strategy is updated or upgraded, it only needs to regenerate a version and burn it into the processor, without replacing the device and the hardware design, resulting in strong adaptability.

Although the present invention has been described above in conjunction with some specific preferred embodiments, it should be understood that the invention is not limited to such specific embodiments. Instead, various modifications and variations may be made without departing from the spirit and scope of the invention as defined by the appended claims and their equivalents.

What is claimed is:

1. A system energy efficiency controller for a ubiquitous energy network, comprising:
 a control decision module;
 a storage module, which is connected with the control decision module, and adapted for storing temporary and permanent data information generated during a system operation process;
 a power clock module, which is connected with the control decision module, and adapted for providing an internal clock and realizing the timing synchronization of a plurality of processors on the controller;
 an internal communication module, which is adapted for providing bidirectional communication between the system energy efficiency controller and control implementing units of a plurality of terminal devices; and
 an external communication module, which is adapted for providing bidirectional communication between the system energy efficiency controller and an upper-layer local-area optimizer;
 wherein, the plurality of terminal devices include at least one of terminal devices in four stages of energy generation, energy storage, energy utilization and energy regeneration,
 wherein, the ubiquitous energy network is formed by nodes that are connected together via a virtual pipeline interconnected network architecture for transmitting a ubiquitous energy flow, with the ubiquitous energy flow being bidirectionally transmitted between the nodes,
 wherein the nodes include a system energy efficiency controller, and at least one selected from a group consisting of other nodes connected to the system energy efficiency controller, an energy generation device, an energy storage device, an energy utilization device and an energy regeneration device,
 wherein a local-area optimizer, which is a network node at a local-area optimization layer, and which performs an area optimization function also performs integrated optimization according to operating information uploaded by each system energy efficiency controller inside an area and upper-layer planning information, and sends the operating information of the area to a node of a upper-layer network, and
 wherein the system energy efficiency controller, which is a master control device at a ubiquitous energy control layer and which performs the functions of the ubiquitous energy control layer, performs integrated control according to the operating information of each of the terminal devices in each of the plurality of stages including energy generation, storage, utilization and regeneration in a controlled range of the system energy efficiency controller, and carries out bidirectional ubiquitous energy flow interaction with a node of the upper-layer network.

2. The system energy efficiency controller according to claim 1, wherein the system energy efficiency controller integrates operation status of each terminal device, generates control information for each terminal device and sends the control information to said each terminal device; where the control implementing unit of each terminal device transforms the control information into a drive signal needed for controlling.

3. The system energy efficiency controller according to claim 2, wherein the system energy efficiency controller optimizes system energy utilization efficiency by constructing a positive feedback loop between the terminal devices.

4. The system energy efficiency controller according to claim 2, wherein the system energy efficiency controller realizes a gain of system energy utilization efficiency by introducing environment potential energy.

5. The system energy efficiency controller according to claim 1, wherein the internal communication module comprises at least one selected from an M-BUS port, an RS 485 port, a ZigBee port, a 433 MHz port and an EPON port.

6. The system energy efficiency controller according to claim 1, wherein the external communication module comprises at least one selected from an Ethernet port, a USB port, a GPRS/3 G port, a PLC port and an EPON port.

7. A control method performed by a system energy efficiency controller, comprising steps of:
 a) establishing/updating a four-stage model according to a preset time/event driving principle;
 b) reading decision information of a wide-area control layer and a local-area optimization layer from an upper-layer local-area optimizer via an external communication channel;
 c) collecting sensor information of terminal devices in four stages of energy generation, energy storage, energy utilization and energy regeneration inside a controlled area via an internal communication channel;
 d) performing system optimization according to the four-stage model and the received decision information and sensor information;
 e) performing energy efficiency gaining according to the four-stage model and the received decision information and sensor information;

f) distributing control information to the terminal devices in the four stages of energy generation, energy storage, energy utilization and energy regeneration via the internal communication channel;

g) determining whether a suitable opportunity for reporting operating information has arrived;

h) reporting the operating information to the local-area optimizer via the external communication channel at the ubiquitous energy control layer if it is determined that the suitable opportunity for reporting operating information has arrived;

i) determining whether a suitable opportunity for updating the four-stage model has arrived;

j) repeating steps a)-i) if it is determined that a suitable opportunity for updating the four-stage model has arrived; and k) repeating steps b)-j) if it is determined that a suitable opportunity for updating the four-stage model has not arrived.

8. The method according to claim 7, wherein the step d) comprises constructing a positive feedback loop between the terminal devices so as to optimize the system energy utilization efficiency.

9. The method according to claim 7, wherein the step e) comprises introducing an environment potential energy so as to realize the gain of system energy utilization efficiency.

10. A control method performed by terminal devices in four stages of energy generation, energy storage, energy utilization and energy regeneration, comprising steps of:

a) reading control information of a corresponding terminal device from a system energy efficiency controller via an internal communication channel at a ubiquitous energy control layer;

b) collecting local sensed information and operating information of the corresponding terminal device, and temporally storing the collected information in a local storage;

c) controlling operating parameters of the corresponding terminal device according to the control information that is read;

d) determining whether a suitable opportunity for reporting the operating information has arrived;

e) reporting the operating information to the system energy efficiency controller via the internal communication channel at a ubiquitous energy control layer, if it is determined that the suitable opportunity for reporting the operating information has arrived; and f) repeating steps a)-e), wherein, a ubiquitous energy network is formed by nodes that are connected together via a virtual pipeline interconnected network architecture for transmitting a ubiquitous energy flow, with the ubiquitous energy flow being bidirectionally transmitted between the nodes, wherein the nodes include a system energy efficiency controller, and at least one selected from a group consisting of other nodes connected to the system energy efficiency controller, an energy generation device, an energy storage device, an energy utilization device and an energy regeneration device, wherein a local-area optimizer, which is a network node at a local-area optimization layer, and which performs an area optimization function also performs integrated optimization according to operating information uploaded by each system energy efficiency controller inside an area and upper-layer planning information, and sends the operating information of the area to a node of a upper-layer network, and wherein the system energy efficiency controller, which is a master control device at a ubiquitous energy control layer and which performs the functions of the ubiquitous energy control layer, performs integrated control according to the operating information of each of the terminal devices in each of the plurality of stages including energy generation, storage, utilization and regeneration in a controlled range of the system energy efficiency controller, and carries out bidirectional ubiquitous energy flow interaction with a node of the upper-layer network.

11. The method according to claim 10, wherein, in step e), the reported operating information depends on the type of the terminal devices in the four stages of energy generation, energy storage, energy utilization and energy regeneration.

* * * * *